Figure 1:
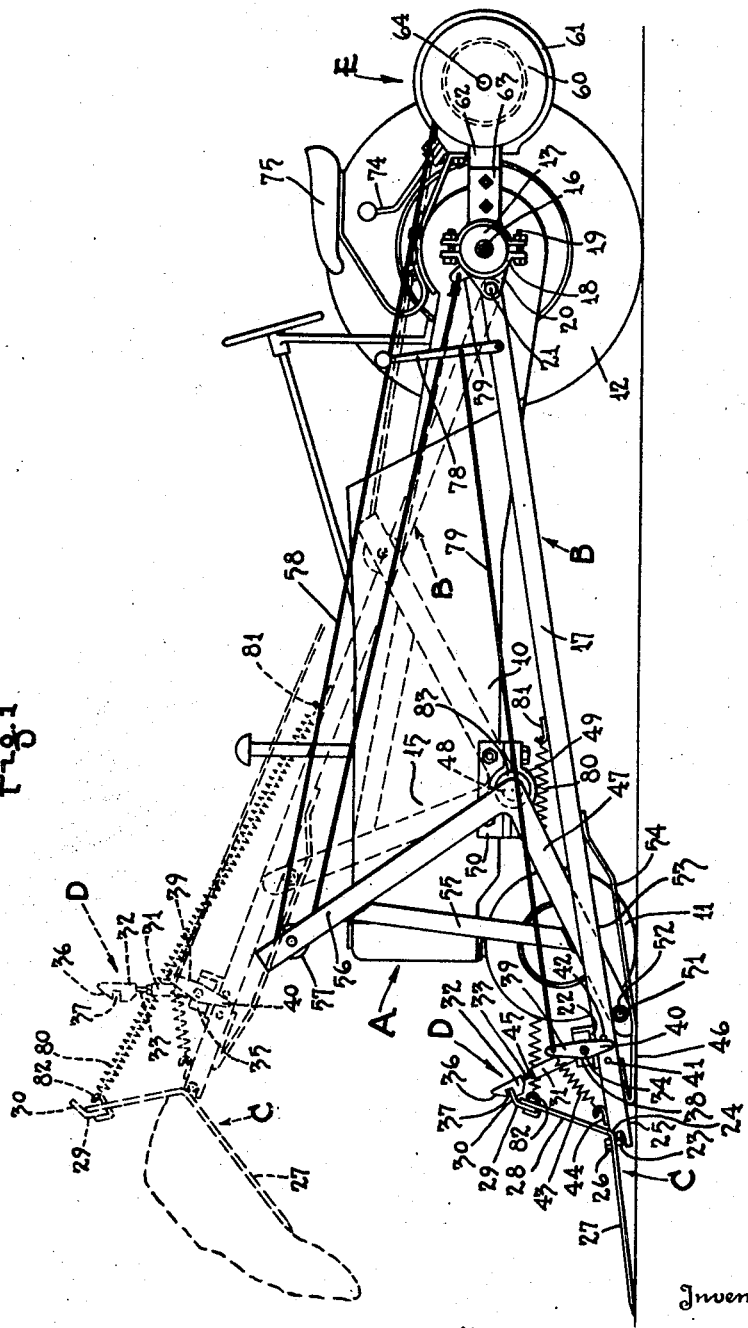

Feb. 18, 1947. C. R. KOEHL ET AL 2,415,892
MATERIAL-HANDLING MACHINE
Filed Feb. 17, 1945 2 Sheets-Sheet 1

Inventors
Charles R. Koehl and
Richard Messner
By Canwell & Lagaard
Attorneys

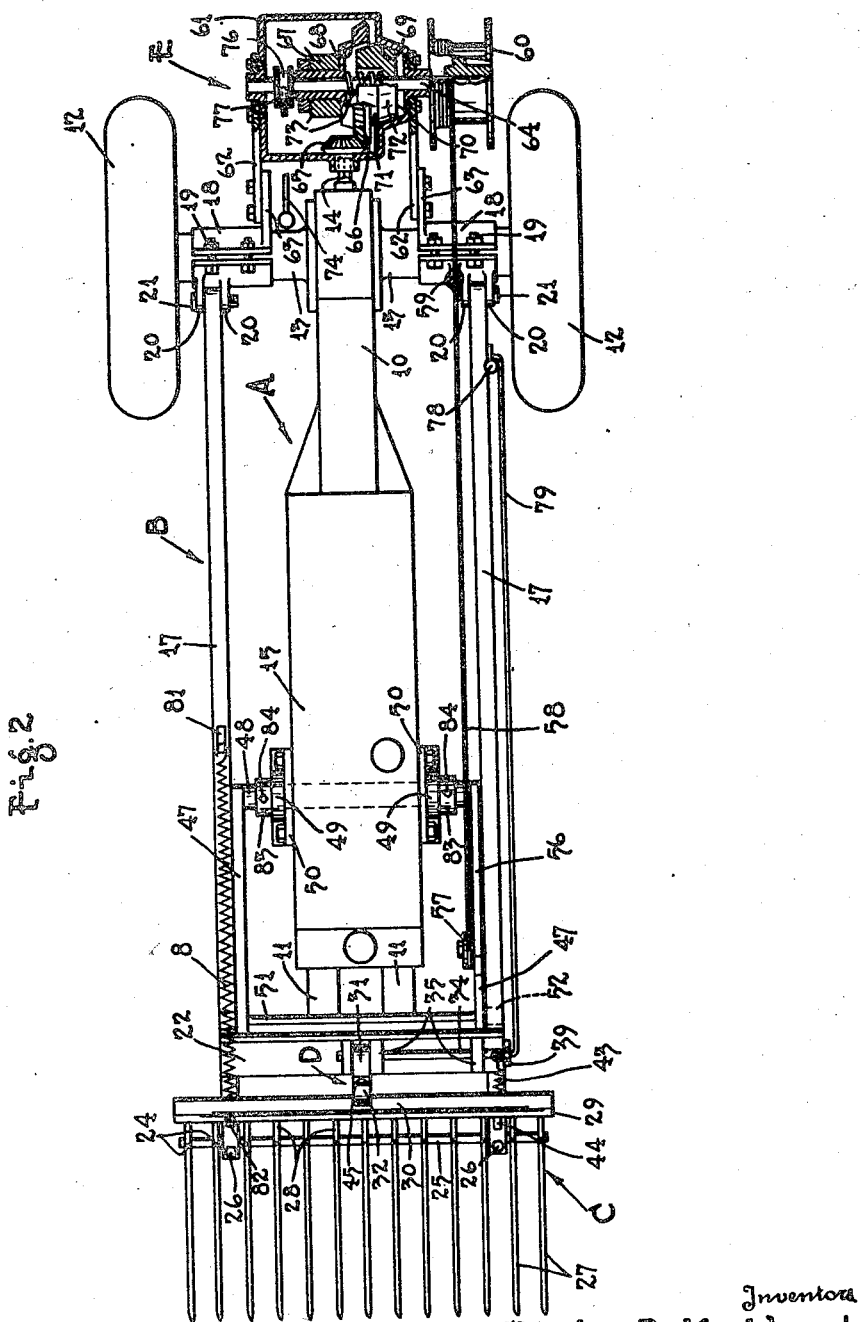

Patented Feb. 18, 1947

2,415,892

UNITED STATES PATENT OFFICE 2,415,892

MATERIAL-HANDLING MACHINE

Charles R. Koehl and Richard Messner, Hancock, Minn.

Application February 17, 1945, Serial No. 578,427

4 Claims. (Cl. 214—140)

Our invention relates to improvements in material-handling machines, and more particularly to tractor-mounted machines of the type known as front-end loaders, for gathering and/or picking up and transporting and dumping loads of various kinds of material.

A machine of the present type, conventionally includes a tractor, ordinarily of the kind commonly used on farms and further includes a loading attachment for such tractor, such attachment having a load-carrying member and a boom structure supporting the same and raised and lowered by power derived from the tractor.

An object of the present invention is to provide an improved material-handling machine of the type indicated which is extremely simple, durable and inexpensive in construction and highly efficient in operation.

More specifically, it is an object of our invention to provide a machine, as above, having a lift mechanism for the boom structure powered from the tractor engine and including a rock-shaft having thereon a power arm and a lift arm, all arranged with respect to each other and to the tractor and boom structure, whereby said boom structure is efficiently operated in the raising, holding and lowering thereof; the over-all height of the machine is minimized, and said boom structure is simply and effectively braced against transverse movements relative to the tractor.

Another object of the invention is to supply a machine of the instant nature constructed to facilitate the application of the loader attachment to and the removal thereof from the tractor.

An additional object of the invention is to mount the load-carrying member on the boom structure so that it is self-tilting to dump its load by gravity, another object of the invention being to provide simple and effective means for automatically restoring the gravity-tilted load-carrying member to its normal load-receiving position relative to the boom structure.

Other objects of the invention reside in the novel combination and arrangement of parts and in the details of construction hereinafter illustrated and/or described.

In the accompanying drawings, Fig. 1 is a side elevational view of a machine embodying our invention and Fig. 2 is a plan view thereof, portions of the machine in each of said views being broken away and/or omitted to reveal parts which otherwise would be concealed.

Reference being had to the drawings, wherein similar parts are designated by similar reference characters in both views, it will be seen that the illustrated embodiment of our invention includes a tractor A of familiar agricultural type having a body 10 supported on front and rear wheels 11, 12. Incorporated in said body 10 are the usual rear axle housings 13 and extending from the rear of the body 10 is the usual power take-off stud-shaft 14. Forwardly of the body 10 and beneath the hood 15 is the usual engine (not shown), the same being conventionally geared to the rear axles 16 and to the power take-off stud-shaft 14.

Load-moving means detachably mounted on the tractor includes a boom structure B consisting of two beams 17 extending fore and aft of the tractor A, one at either side thereof. These beams 17 are pivoted at their rear ends on the tractor body 10 and swing about an axis transversely of the tractor. To provide for thus pivotally mounting said beams 17, we supply a split-sleeve-mount 18 for each of the axle housings 13, each mount 18 being removably clamped to its respective housing by means of bolts 19. Each of said sleeve-mounts 18 is formed with a pair of forwardly projecting ears 20 between which the rear end of its respective beam 17 is received. A pintle 21 extending through these ears 20 and said beam 17 supplies the pivotal support for the latter. The two pintles 21 are axially aligned and they are removable from the ears 20 on their respective mounts 18 to free the boom structure B from the tractor. Near their forward ends, the beams 17 are rigidly tied together by a cross-bar 22 and at their forward extremities, said beams 17 are formed with notches 23 therein extending longitudinally thereof to provide forwardly opening bearings for attachment of a load-carrying member C to the boom structure B, as will soon appear.

The invention contemplates the selective employment of load-carrying members of different forms. In the drawings, we have shown the load-carrying member C in the form of a fork which is especially adapted for use in the handling of manure and hay, grain stocks and other vegetation. Another form of load-carrying member will consist of a scoop and will be interchangeable with the fork C and especially adapted for use in the handling of grain, earth, coal and the like. The illustrated fork C consists of a plurality of tines 24 welded intermediately thereof to a cross-shaft 25. Spaced portions of said shaft 25 are received in the bearing-notches 23 in the beams 17 and removably held seated therein by screws 26 spanning said notches ahead of the shaft 25 and threaded in the beams 17. In the working position of the fork C, as best seen in solid lines in Fig. 1, the main or bottom forming portions 27 of the tines 24 extend forwardly from the cross-shaft 25 longitudinally of the beam 17, while the remaining or back-forming portions 28 of said tines 24 extend upwardly and rearwardly from said cross-shaft 25. The upper ends of the rear portions 28 of the tines 24 are welded to a tie-brace 29 having a reinforcing and latching flange 30 extending rearwardly therefrom. The cross-shaft 26 of the fork C pivots in the notch-bearings 23 of the beams 17 to enable the fork to tilt by gravity, open front end downwardly (dotted lines Fig. 1), and dump its load.

Normally, to keep the fork C in working position with the bottom tine portions 27 thereof extending longitudinally forward from the beams 17, we provide latch means including said latching flange 30 on the fork C and further including a latch-pawl D consisting of a shank 31, head 32 and threaded stem 33 issuing from said head 32 and screwed into said shank 31 longitudinally thereof. The shank 31 extends upwardly from a shaft 34 rockably mounted in bearing blocks 35 on the cross-bar 22 between the beams 17. The head 32 has a nose 36 and is formed at the base of said nose with a forwardly opening latch-slot 37 providing an upwardly facing abutment surface at the bottom thereof and a downwardly facing abutment surface at the top thereof. The forward beveled edge of said nose 36 slopes downwardly to meet said downwardly facing abutment surface and is disposed in the arcuate path of the latching flange 30 on the fork C. One end of the shaft 34 overreaches the beam 17 at the left side of the machine, its projecting end being fitted with a lever 38 having an upwardly extending arm 39 and also with a downwardly extending arm 40 which plays between pins 41, 42 in said beam, said pins forming opposed limit stops for said lever 38. A tension spring 43, stretched between said upper arm 39 and an anchoring hook 44 on said beam 17, normally yieldingly holds the arm 40 of lever 38 against the pin 42, thus stationing the latch-member D in its operative position. In such position of said latch-member D, the slot 37 in the head 32 thereof is located to accommodate the rear central portion of the latching flange 30 on the fork C when said fork is in normal working position relative to the beams 17. With said flange 30 lodged within said slot 37 between the upwardly and downwardly facing abutment surfaces at top and bottom thereof, the fork C is deprived of pivotal movement about the axis of its supporting cross-shaft 25 and is thereby disposed with its tines 24 in operative relation to receive and carry a load. Entry of the latching flange 30 into said latching slot 37 is accomplished upon the swinging of the fork C into working position, by the coaction of said flange 30 with the nose 36 on the head 32 of the latch-member D. This coaction of said parts 30, 36 causes the latch-member D to be swung back against the action of the spring 43 enabling the latching flange 30 to come into registry with the latching slot 37. With the latching flange 30 in registry with said slot 37, the spring 43 acts to swing the latch-member D forward and embrace said flange 30 within the slot 37. To alter the angularity of the fork C relative to the beams 17 and thus effect different working relationships of said fork C with respect to the boom structure B, it is only necessary to turn the stem 33 into or out of the shank 31 to shorten or elongate the latch-member D. A lock-nut 45 on said stem 33 is turned against the shank 31 to prevent the twisting of the head 32 out of any adjusted position in which it may be placed.

Shoes 46 attached to the lower sides of the beams 17 near the forward ends thereof engage the ground to limit the descent of said ends of said beams.

To lift the boom structure B by power from the tractor engine and to hold said structure elevated and to control its descent, we employ mechanism now to be described. This lift mechanism includes a pair of lift arms 47 issuing forwardly from opposite ends of a rock-shaft 48 arranged transversely of the tractor body 10 and removably mounted in cap-bearings 49 on brackets 50 depending from said body 10 between the front and rear wheels 11, 12. Like the two beams 17, the two lift arms 47 are disposed at opposite sides of the tractor. Each arm 47 swings up and down, its outer face lying in a plane adjacently paralleling the plane occupied by the inner face of its respective beam 17. Extending between and through the arms 47 near the tips thereof is a cross-shaft 51, the ends of which, outwardly of said arms, underlie the beams 17 and provide mounting studs for roller bearings 52. Track surfaces 53 on the under sides of the beams 17 ride said roller bearings 52 so that when the lift arms 47 are swung upwardly the beams 17 will be likewise upwardly swung. The shoes 46 have rearwardly extended portions 54 paralleling the track surfaces 53 of the beams 17 and underlying the roller bearings 52 and said portions 54 provide keepers which cooperate with said roller bearings 52 to maintain the rolling relation between the same and said track surfaces 53. Rigidly secured to one end of the transverse rock-shaft 48, and braced by a brace 55 relative to the arm 47 at such end of said rock-shaft, is an upwardly extending lift lever 56 having a sheave 57 at its free end about which a hoisting cable 58 is looped. One end of this cable 58 is tied to an anchoring lug 59 on the rear axle sleeve-mount 18 at the same side of the tractor occupied by said lever 56. The other end of said cable 58 is attached to a reel 60 located at the rear of the tractor and driven and controlled by a clutch and brake mechanism E associated with the power take-off stud 14 of the tractor.

The clutch and brake mechanism E includes a case 61 mounted on arms 62 removably bolted to lugs 63 issuing rearwardly from the sleeve-mounts 18. Journaled in said case 61, transversely of the tractor, is a shaft 64, one end of which extends beyond the case 61 at the same side of the tractor as that of the lift lever 56. To this extended end of said shaft 64, the reel 60 is fixed. Revolubly mounted in the case 61 is a bevel gear 65 having a hub formed with an axial socket of angular cross-section into which extends the power take-off stud 14 of the tractor. Meshing with said bevel gear 65 is a second bevel gear 66, the same being revolubly mounted in the case and held against axial movement therein by a bearing 67. The gear 66 axially coincides with the axis of the shaft 64 and at the side thereof adjacent said reel 60, said gear 66 is formed with an internal annular beveled clutch surface 68. On the case 61 and in opposition to said clutch surface 68 is a similarly formed brake surface 69. Fixed to the shaft 64 between said clutch and brake surfaces 68, 69 is compound clutch-brake member 70 having oppositely beveled external annular surfaces 71, 72, the surface 71 being a clutch surface matching said clutch surface 68 on the bevel gear 66 and the surface 72 being a brake surface matching said brake surface 69 on the case 61. Coiled about the shaft 64 between the bevel gear 68 and the clutch-brake member 70 is a compression spring 73 acting normally to slide the shaft 64 axially to a position wherein the brake surface 72 on the clutch-brake member 70 engages the brake surface 69 on the case 61 and wherein the clutch surface 71 of said clutch-brake member 70 is disengaged from the clutch surface 68 of the bevel gear 66. For countering the action of said spring 73, a hand lever 74 is employed, the same being pivoted on and extending into the case 61. This lever 74 is accessible at its upper end to an operator seated in the tractor seat 75. The lower end of said hand lever 74 reaches into an annular groove 76 in a shifting collar 77 fixed to the shaft 64. Said lever 74 acts through said collar 77 to shift the shaft 64 against the force of said spring 73 to disengage the brake surface 72 of the clutch-brake member 70 from the brake surface 69 on the case 61 and to engage the clutch surface 71 of said clutch-brake member 70 with the clutch surface 68 on the bevel gear 66.

In use and while the machine is being driven from place to place to pick up and to dump material, the boom structure B is held in elevated position with the fork C clear of the ground surface, such positioning of the boom structure being accomplished, first, by swinging the lever 74 to the left to effect the reeling in of the hoisting cable 58 and, secondly, by releasing said lever to allow the automatic braking of said reel 60 against unwinding rotation. Arriving at the side of the material to be picked up, the lever 74 is eased to the left to enable the reel 60 to unwind under restraint and thus control the descent of the boom structure B to a position presenting the tines 24 of the fork C to the work at the desired elevation. Advancing the machine and thrusting the fork C into the material to be handled, said fork will be loaded with material. Thereupon, the operator will swing the lever 74 to the left and then release it to elevate and to hold the boom structure B while the machine is in transit to the site where the load on the fork is to be dumped. Arriving at such site, the desired elevation of the boom structure B is attained, if not theretofore attained, and the fork C is then released to enable it to tilt forwardly about the axis of its cross-shaft 25, under the weight of its load, and dump such load from its open front end. For releasing the fork C for such gravitational tilting load-dumping movement, a trip-lever 78 is supplied within easy reach of the operator on the tractor seat 75. This triplever 78 is pivoted to the beam 17 at the left side of the machine and is connected by means of rod or cable 79 with the upper arm 39 of the lever 38 on the rock-shaft 34. A pull upon said triplever 78, against the action of the spring 48, turns the rock-shaft 34 and retracts the latchmember D sufficiently to withdraw its latching head 32 from the latching flange 30 of the fork C and free said fork to its gravitational tilting movement. This tilting dumping movement of the fork, induced by the weight of the load thereon, is accomplished against the action of a resetting-spring 80 stretched between an anchoring hook 81 on one of the beams 17 and a second anchoring hook 82 on the tie-bar 31 at the back of the fork C. Although the power of the spring 80 is insufficient to balance the loaded fork, it is of sufficient power to tilt the fork C back into the normal working position thereof after the load has been dumped from said fork. Thus, upon the forward and rearward tilting of the fork C in dumping a load and in restoring the fork to its working position relative to the beams 17, the operator is obliged only to exert a single pull upon the trip-lever 78, such act being followed, first, by the self-tilting of the loaded fork C in discharging its load and, secondly, by the spring induced return of said fork, to its normal load-receiving relation.

As hereinbefore indicated, the load-carrying member optionally may be in the form of a scoop having a solid bottom, back and sides, but open at the front end thereof like the fork C. Also like said fork C, the scoop will have a pivot shaft with portions thereof receivable in the bearing-notches 23 in the beams 17 and, further, will have a latching projection at the back thereof, equivalent to the flange 30 of the fork C and which is received in the notch 37 of the latch-member D.

Attention is invited to the relative positions assumed by the beams 17, lift arms 47 and lift lever 56 at the various stages in the elevation of the boom structure B. At the outset, when the greatest effort is required in initially lifting a load, the leverage between parts of the lift mechanism is most highly effective and this, of course, is accompanied with the optimum condition, wherein the speed of the initial upward movement of the load-carrying member C is rendered relatively slow.

End-thrust collars 83 fixed to the transverse shaft 48 by set screws 84 oppositely bear against the cap-bearings 49 of the brackets 50 on the tractor frame 10. These collars 83 deprive the transverse shaft 48 of axial movement relative to the tractor frame 10 and thus stabilize the lift arms 47 transversely of the tractor and thereby enable said lift arms 47, in turn, similarly to stabilize the beams 17, it being understood that the other faces of the lift arms 47 constitute side-thrust surfaces against which the inner faces or side-thrust surfaces of the beams 17 bear. This is an important feature in a machine of the instant nature, wherein heavy side thrusts are imposed upon the parts in a manner tending injuriously to move the boom structure B transversely relative to the tractor body 10.

The underslung disposition of the transverse shaft 48 is important not only in effecting the efficient transmission of forces between the lift arms 47 and beams 17 in elevating the boom structure B, but also in facilitating the attachment of the load-moving mechanism to and the detachment thereof from the tractor A. In preparing to attach said mechanism to the tractor, the boom structure B and the assembled lift arms 47 are placed on the ground. The front wheels 11 of the tractor are then run over the transverse shaft 48, said shaft being thereafter lifted the short distance required for application to the cap-bearings 49 on the depending brackets 50. The beams 17 are, of course, easily attached to and removed from the sleeve-mounts 18 and the clutch-brake mechanism E alone, or along with said sleeve-mounts 18, is readily attached to or removed from the tractor.

From the foregoing, it will be readily comprehended that our improved material-handling machine can embrace any of numerous suitable tractors; that the loader proper can be quickly and easily attached to such tractor and likewise detached therefrom to make the same available for any of the usual uses of the conventional tractor; that the forces exerted through the lift mechanism for raising, holding and lowering the boom structure are efficiently applied thereto in its various stages of operation; that said boom structure is effectively braced against transverse movement relative to the tractor by the lift mechanism itself; that the over-all height of the machine is not in excess of that of the tractor, except upon the elevation of the load-carrying member thereabove and, then, not in excess of the height occupied by such member; that the construction of our machine, while relatively simple and inexpensive, is extremely sturdy, and that said machine is capable of ready and successful operation at the hands of any ordinary user and with relatively little effort on his part.

Changes in the specific form of our invention, as herein described, may be made within the scope of what is claimed without departing from the spirit of our invention.

Having described our invention, what we claim as new and desire to protect by Letters Patent is:

1. In a tractor-mounted material-handling machine, a tractor including a wheeled body, and an engine supported thereby, load-moving means carried by the tractor and including a pair of beams at opposite sides of the body extending fore and aft thereof and pivoted at their rear ends to the body to swing up and down about a transverse axis, a load-carrying member carried by the beams at the front thereof forwardly of the tractor, bearing-brackets depending from said body, a transverse rock-shaft under the body mounted to turn in said bearing-brackets, means on said rock-shaft cooperating with the bearing-brackets to deprive the rock-shaft of axial movement relative to said body, lift arms issuing forwardly from opposite ends of the rock-shaft, each arm swinging in a plane located inside of and adjacently paralleling the plane of movement of the beam at its respective side of the machine, bearings, one for each arm, each bearing being disposed transversely outward relative to its respective arm, each beam having a downwardly facing track at its forward portion slidably supported on the bearing for the adjacent arm, said arms providing side-thrust elements for countering side thrusts of said beams relative to said body, a lever issuing from said rock-shaft, and lever operating means connected with said lever and powered by the engine to swing said lever and through the same to swing said beams.

2. In a tractor-mounted material-handling machine, a tractor including a wheeled body, and an engine supported thereby, load-moving means carried by the tractor and including a pair of beams at opposite sides of the body and extending fore and aft thereof and pivoted at their rear ends to the body to swing up and down about a transverse axis, a load-carrying member carried by the beams at the front thereof forwardly of the tractor, a transverse rock-shaft underslung from the body of the tractor and deprived of axial movement relative thereto, lift arms issuing forwardly from opposite ends of the rock-shaft, each arm swinging in a plane adjacent to the plane of movement of the beam at its respective side of the machine, bearings, one for each arm, each bearing being disposed transversely outward relative to its respective arm, each beam having a downwardly facing track at its forward portion slidably supported on the bearing for the adjacent arm, said arms having outer thrust surfaces and said beams having inner thrust surfaces respectively cooperating with the thrust surfaces on said arms to counter side thrusts of said beams relative to said body, a lever issuing from said rock-shaft, lever operating means connected with said lever and powered by the engine to swing said lever and through the same to swing said beams.

3. In a tractor-mounted material-handling machine, a tractor including a wheeled body, and an engine supported thereby, load-moving means carried by the tractor and including a pair of beams at opposite sides of the body, extending fore and aft thereof and pivoted at their rear ends to the body to swing up and down about a transverse axis, a load-carrying member carried by the beams at their front ends forwardly of the tractor, lift arms pivoted to the body at opposite sides thereof, each of said arms being swingable between downwardly and upwardly inclined positions and in a plane adjacent to the plane of movement of the beam at its respective side of the machine, bearings, one for each arm, each bearing being disposed transversely outward from the outer side of its respective arm and spaced from its upper edge and from the free end thereof, each beam having a downwardly facing track slidably supported on the bearing for the adjacent arm, said arms having outer thrust surfaces and said beams having inner thrust surfaces respectively cooperating with the thrust surfaces on said arms in all positions thereof to counter side thrusts of said beams relative to said body, and means powered by the engine to swing said arms.

4. In a tractor-mounted material-handling machine, a tractor including a wheeled body, and an engine supported thereby, load-moving means carried by the tractor and including a pair of beams at opposite sides of the body, extending fore and aft thereof and pivoted at their rear ends to the body to swing up and down about a transverse axis, a load-carrying member carried by the beams at their front ends forwardly of the tractor, lift arms pivoted to the body at opposite sides thereof, each of said arms being swingable between downwardly and upwardly inclined positions and in a plane adjacent to the plane of movement of the beam at its respective side of the machine, means connecting each arm with its respective beam for lifting the latter through the former, said arms having outer thrust surfaces and said beams having inner thrust surfaces respectively cooperating with the thrust surfaces on said arms in all positions thereof to counter side thrusts of said beams relative to said body, and means powered by the engine to swing said arms.

CHARLES R. KOEHL.
RICHARD MESSNER.

REFERENCES CITED

The following references are of record in the file of this patent:

UNITED STATES PATENTS

| Number | Name | Date |
|---|---|---|
| 1,477,136 | Laurie | Dec. 11, 1923 |
| 2,371,273 | Walker | Mar. 13, 1945 |
| 2,286,947 | Bankson | June 16, 1942 |
| 2,363,986 | Mott | Nov. 28, 1944 |
| 2,301,102 | Werthman et al. | Nov. 3, 1942 |
| 2,393,299 | Denning | Jan. 22, 1946 |
| 2,242,511 | Cook | May 20, 1941 |
| 2,305,119 | Walker | Dec. 15, 1942 |
| 2,311,671 | Larsen | Feb. 23, 1943 |